US007541079B2

(12) United States Patent
Kuntz et al.

(10) Patent No.: US 7,541,079 B2
(45) Date of Patent: Jun. 2, 2009

(54) FUSER MEMBER WITH DIAMOND FILLER

(75) Inventors: Alan Richard Kuntz, Webster, NY (US); Patrick James Finn, Webster, NY (US); Joy Lynn Longhenry, Webster, NY (US); Richard P. Carney, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 175 days.

(21) Appl. No.: 11/644,624

(22) Filed: Dec. 22, 2006

(65) Prior Publication Data

US 2008/0152405 A1 Jun. 26, 2008

(51) Int. Cl.

| | |
|---|---|
| ***B32B 1/08*** | (2006.01) |
| ***B32B 5/16*** | (2006.01) |
| ***B32B 25/02*** | (2006.01) |
| ***B32B 27/04*** | (2006.01) |
| ***G03G 15/20*** | (2006.01) |

(52) U.S. Cl. .................... 428/36.91; 428/323; 428/421; 428/422; 399/333

(58) Field of Classification Search ....................... None
See application file for complete search history.

(56) References Cited

U.S. PATENT DOCUMENTS

| | | | |
|---|---|---|---|
| 4,763,158 | A | 8/1988 | Schlueter, Jr. |
| 5,217,837 | A | 6/1993 | Henry et al. |
| 5,219,612 | A | 6/1993 | Bingham et al. |
| 5,332,641 | A | 7/1994 | Finn et al. |
| 5,595,823 | A | 1/1997 | Chen et al. |
| 5,674,621 | A | 10/1997 | Visser et al. |
| 5,998,033 | A | 12/1999 | Tan et al. |
| 6,011,946 | A | 1/2000 | Eddy et al. |
| 6,096,429 | A | 8/2000 | Chen et al. |
| 6,218,014 | B1 | 4/2001 | Pickering et al. |
| 6,582,871 | B2 | 6/2003 | Pickering |
| 6,733,943 | B2 | 5/2004 | Finn et al. |
| 6,829,466 | B2 | 12/2004 | Finn et al. |
| 6,838,140 | B1 | 1/2005 | Heeks et al. |
| 6,923,533 | B2 | 8/2005 | Pan et al. |
| 6,927,006 | B2 | 8/2005 | Finn et al. |
| 6,985,690 | B2 | 1/2006 | Odell et al. |
| 7,014,976 | B2 | 3/2006 | Pickering et al. |
| 7,016,631 | B2 | 3/2006 | Schlafer et al. |
| 2002/0136573 | A1 | 9/2002 | Ogren et al. |
| 2003/0049056 | A1 | 3/2003 | Finn et al. |
| 2003/0207078 | A1 | 11/2003 | Finn et al. |
| 2004/0023144 | A1 | 2/2004 | Pickering et al. |
| 2004/0109055 | A1 | 6/2004 | Pan et al. |
| 2004/0109057 | A1 | 6/2004 | Pan et al. |
| 2004/0165917 | A1* | 8/2004 | Sugawara et al. ........... 399/333 |
| 2005/0153124 | A1 | 7/2005 | Finn et al. |
| 2005/0214033 | A1 | 9/2005 | MacMillan et al. |

OTHER PUBLICATIONS

U.S. Appl. No. 11/139,891, filed May 27, 2005, Finn, et al.
U.S. Appl. No. 11/135,586, filed May 23, 2005, Blair, et al.

* cited by examiner

*Primary Examiner*—Ramsey Zacharia
(74) *Attorney, Agent, or Firm*—Fay Sharpe LLP

(57) ABSTRACT

A fuser member suited to use in a fusing apparatus of an electrostatographic image rendering device includes a substrate and an outer layer over the substrate. The outer layer includes a matrix material and filler particles dispersed in the matrix material. At least some of the filler particles are formed from diamond, which may provide improved wear of the fuser member and may also provide the layer with improved thermal conductivity.

23 Claims, 3 Drawing Sheets

FUSER MEMBER WITH DIAMOND FILLER

CROSS REFERENCE TO RELATED PATENTS AND APPLICATIONS

The following copending applications, the disclosures of which are incorporated herein in their entireties by reference, are mentioned:

application Ser. No. 11/139,891, filed May 27, 2005, entitled FUSER MEMBER HAVING HIGH GLOSS COATING LAYER, by Patrick J. Finn, et al.; and application Ser. No. 11/135,586, filed May 23, 2005, entitled FUSER MEMBER COMPRISING DEFLOCCULATED MATERIAL, by Blair, et al.

BACKGROUND

The exemplary embodiment relates to fuser members. It finds particular application in connection with a fuser member with a release layer which includes a halopolymer, such as a fluoroelastomer or thermoplastic halopolymer, having diamond particles distributed therein.

In a typical xerographic printing device, such as a copier or printer, a photoconductive insulating member is charged to a uniform potential and thereafter exposed to a light image of an original document to be reproduced. The exposure discharges the photoconductive insulating surface in exposed or background areas and creates an electrostatic latent image on the member, which corresponds to the image areas contained within the document. Subsequently, the electrostatic latent image on the photoconductive insulating surface is made visible by developing the image with a developing material. Generally, the developing material comprises toner particles adhering triboelectrically to carrier granules. The developed image is subsequently transferred to a print medium, such as a sheet of paper. The fusing of the toner onto the paper is generally accomplished by applying heat to the toner with a heated fuser member and application of pressure.

Fuser members in the form of a roll or belt often have an outer layer or release layer formed of a conformable material which is compatible with the high temperatures employed in fusing. Exemplary coatings for forming the release layer include halopolymers, such as polytetrafluoroethylene, fluorinated ethylene propylene copolymers, fluorosilicone rubbers, fluoroelastomers, and the like. To ensure and maintain good release properties of the fuser member, it has become customary to apply release agents to the fuser member during the fusing operation. Typically, these materials are applied as thin films of, for example, silicone oils to minimize toner offset.

Over time, fuser members coated with, for example, a fluoroelastomer, tend to yield copies which have noticeable print defects, such as gloss variations, due to uneven wear of the coating. In particular, edgewear results from the use of paper of a particular size over an extended period. The portion of the fuser member outside the paper area wears at a different rate from that inside. When paper of a different size is used, an imprint of the size of the original paper tends to appear on the fused sheets. Some extension of the life of a fuser roll has been achieved in the past by distributing the wear. For example, improved wear life of the fuser roll has been achieved by moving the paper edge or accessories relative to the rollers, using very low loading force on sensors and fingers in contact with the surfaces, and using retractable members such as stripper fingers.

A need remains, however, for fuser components for use in electrostatographic machines that have superior mechanical properties. Further, a need remains for fuser coatings having reduced susceptibility to contamination, scratching, and other damage. In addition, a need remains for a fuser component having a longer life. Even further, a need remains for a fuser component that maintains high gloss even as the surface is worn by media or other hardware within the fuser apparatus.

INCORPORATION BY REFERENCE

The following references, the disclosures of which are incorporated herein in their entireties by reference, are mentioned:

U.S. Pat. No. 5,217,837 describes a multilayered fuser member for fusing thermoplastic resin toner images to a substrate. The fuser member includes a base support member, a thermally conductive silicone elastomer layer, an amino silane primer layer, an adhesive layer, and an elastomer fusing surface comprising poly (vinylidene fluoride-hexafluoropropylene-tetrafluoroethylene). A metal oxide is present in the fusing surface to interact with the polymeric release agent to provide an interfacial barrier layer between the fusing surface and the toner and substantially unreactive with the elastomer.

U.S. Pat. No. 5,595,823 describes a fuser member that includes a core and a layer overlying the core. The layer overlying the core includes a cured fluorocarbon random copolymer with certain fluorinated subunits and a particulate filler that includes aluminum oxide and an alkali metal oxide or hydroxide.

U.S. Pat. No. 5,998,033 describes a fuser member with an outermost layer including a fluoroelastomer with thermally conductive metal oxide fillers and a silane coupling agent that is interactive with the fluoroelastomer and with an optional release agent.

U.S. Pat. No. 6,011,946 is directed to a fuser member having a substrate and a filled polymeric outer layer over the substrate, wherein the filled polymeric outer layer includes a zinc compound dispersed therein. The fuser member also includes a fluid release agent with molecules having amino functionality.

U.S. Pat. No. 6,096,429 is directed to a fuser member having a core and a layer overlying the core wherein the layer overlying the core includes a cured fluorocarbon random copolymer which incorporates a particulate filler that includes zinc oxide, cupric oxide and a material selected from alkali metal oxides and hydroxides. The filler has a total concentration in the layer of 12% to 75% of the total volume of the layer.

U.S. Pat. No. 6,218,014 describes a fuser member comprising a support and coated thereon a fluorocarbon elastomer layer containing a silicon carbide filler and a cupric oxide filler, and/or a silicon carbide filler treated with a silane coupling agent having a reactive functional group. The fuser member further includes a functionalized polydimethylsiloxane release agent applied to the fluorocarbon elastomer layer in an amount sufficient to produce, upon incubation at elevated temperature, a surface having improved toner release properties on said outermost layer.

U.S. Pat. No. 6,582,871 describes a fuser member comprising a base, and a fusing surface layer comprising at least one fluoroelastomer and an $Fe_2O_3$ filler.

U.S. Pat. No. 6,733,943 describes a fuser component having a substrate, an optional intermediate and/or adhesive layer, and an outer polyimide layer. The outer polyimide layer may include a filler including carbon fillers, metals, metal oxides, doped metal oxides, ceramics, polymer fillers, and nanofillers.

U.S. Pat. No. 6,829,466 describes a fuser component having a layer of high temperature plastic and a low surface energy filler, such as a carbon filler, metal, metal oxide, doped metal oxides, ceramic, polymer filler, or nanofillers.

U.S. Pat. No. 6,838,140 describes a fuser component having a substrate and a silicon rubber layer over the substrate. The silicon rubber layer has a crosslinked product of at least one platinum catalyzed additional curable vinyl terminated polyorganosiloxane, aluminum oxide fillers, iron oxide fillers, cross linking agent, and an optional outer fluoroelastomer layer.

U.S. Pat. No. 6,923,533 describes an imaging apparatus for use in offset printing or inkjet printing apparatuses. An imaging member includes an imaging substrate, and thereover an outer coating comprising a nano-size filler having an average particle size of from about 1 to about 250 nanometers.

U.S. Pat. No. 6,927,006 describes a fuser member having a polyimide substrate, and thereover an outer layer with from about 61 to about 99 volume percent fluorocarbon. A low surface energy filler and/or electrically conducted filler and/or chemically reactive filler may be present in the fluorocarbon outer layer, including carbon fillers, metals, metal oxides, doped metal oxides, ceramics, polymer fillers, and nanofillers, such as boron nitride.

U.S. Pat. No. 6,985,690 discloses polyetherimide-b-polysiloxane block copolymers useful as surface layers for a fuser member in various printing devices, which may be fluorinated or include at least 50% by weight siloxane.

U.S. Pat. No. 7,014,976 discloses a fuser member comprising a core and a pliant coating thereon. The coating comprises a base cushion layer comprised of a first elastomeric composition, with a surface layer thereover which includes a second elastomeric composition. The surface layer includes a particulate silica filler in an amount of about 10 percent by volume or less.

U.S. Published application No. 2005/0153124 discloses a fluoroelastomer loaded with an inorganic filler which is coupled to the fluoroelastomer by a titanate, zirconate or aluminate for use as a base layer or a release layer on a fuser. The coupled filler bonds tightly to the fluorocarbon matrix, significantly decreasing the wear rate of the member.

BRIEF DESCRIPTION

In accordance with one aspect of the exemplary embodiment, a fuser member is provided for fixing a developed image to a copy substrate. The fuser member includes a substrate and an outer layer over the substrate. The outer layer includes a halopolymer and filler particles, the filler particles including diamond.

In accordance with another aspect of the exemplary embodiment, an image rendering device includes an image applying component for applying an image to a copy substrate and a fusing apparatus which receives the copy substrate with the applied image from the image applying component and fixes the applied image more permanently to the copy substrate. The fusing apparatus includes a fusing member and a pressure member which define a nip therebetween for receiving the copy substrate therethrough. At least one of the fuser member and the pressure member includes an outer layer which comprises a matrix material and a filler dispersed therein. The filler includes particles formed of diamond.

In accordance with another aspect of the exemplary embodiment, a method of forming a fusing member includes providing a substrate and forming an outer layer over the substrate, the outer layer including a halopolymer and filler particles, the filler particles including diamond.

DETAILED DESCRIPTION

The present exemplary embodiment relates to an image rendering device which includes a fusing apparatus for fixing a developed image on a copy substrate. The fusing apparatus includes a fuser member which comprises a substrate and, thereover, a layer comprising a polymeric material, such as a fluorocarbon polymer, with filler particles comprising diamond incorporated therein. In various embodiments, the layer comprising filler particles is the outermost layer of the fuser member. The image rendering device may be a printer, copier, bookbinding machine, or a multifunction device. The exemplary fuser member is suitable for use in electrostatographic, e.g., xerographic, printing processes and is described with particular reference thereto.

Figure 1:
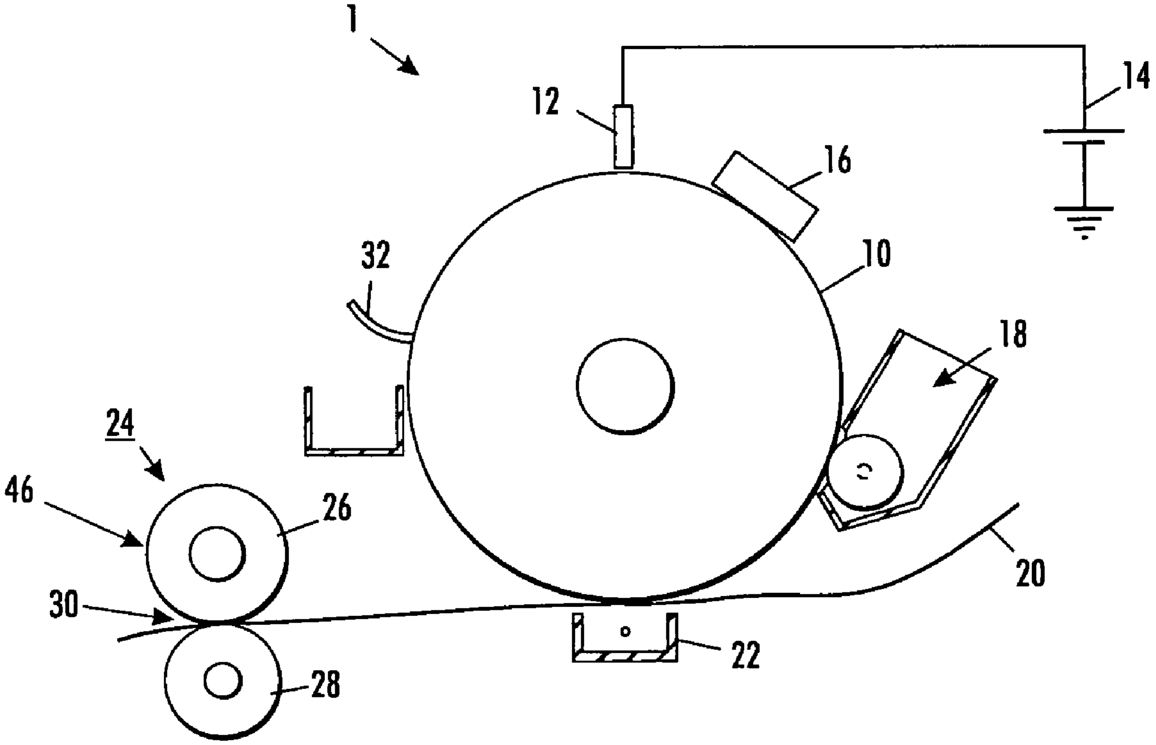
FIG. 1 is a schematic elevational view of an image rendering device in the form of an electrostatographic apparatus which includes a fusing apparatus in accordance with one aspect of the exemplary embodiment.

With reference to FIG. 1, in a typical electrostatographic image rendering device, a light image of an original to be copied is recorded in the form of an electrostatic latent image upon a photosensitive member and the latent image is subsequently rendered visible by the application of electroscopic thermoplastic resin particles, which are commonly referred to as toner. Specifically, the illustrated image rendering device includes an image applying component for applying images to a copy substrate, such as a sheet and a fusing apparatus incorporating the exemplary fuser member for fixing, e.g., fusing the images more permanently to the copy substrate. The copy substrate can be a sheet or extended web of paper, plastic, or other generally flexible material.

The illustrated image applying component 1 includes a photoreceptor 10, which is charged on its surface by means of a charger 12 to which a voltage has been supplied from a power supply 14. The photoreceptor is then imagewise exposed to light from an optical system or an image input apparatus 16, such as a laser and light emitting diode, to form an electrostatic latent image thereon. Generally, the electrostatic latent image is developed by bringing a developer mixture comprising toner particles from a developer station 18 into contact therewith. Development can be effected by use of a magnetic brush, powder cloud, or other known development process. Liquid marking materials, such as liquid toners are also contemplated.

After the toner particles have been deposited on the photoconductive surface, in an image configuration, they are transferred to a copy sheet 20 by transfer device 22, such as a transfer corotron. Alternatively, the developed image can be transferred to an intermediate transfer member and subsequently transferred to a copy sheet.

After the transfer of the developed image is completed, copy sheet 20 advances to a fusing apparatus 24. The fusing apparatus is depicted in FIG. 1 as including rolls 26, 28 which, during operation, rotate about a longitudinal axis which is generally perpendicular to the direction of travel of the copy sheet. Rolls 26, 28 serve as a fuser member and a pressure member, respectively, and define a nip 30 therebetween.

The developed image is fused to copy sheet 20 by passing the copy sheet through the nip 30 between the fuser member 26 and pressure member 28, thereby forming a permanent image. Photoreceptor 10, subsequent to transfer, advances to cleaning station 32, wherein any toner left on photoreceptor 10 is cleaned therefrom by use of a blade, brush, or other cleaning apparatus. Although in the fusing apparatus 24, the fusing and pressure members are depicted as rollers 26, 28, the fuser and/or pressure member(s) may also be in the form of belts, sheets, films or other like fusing members.

Figure 2:
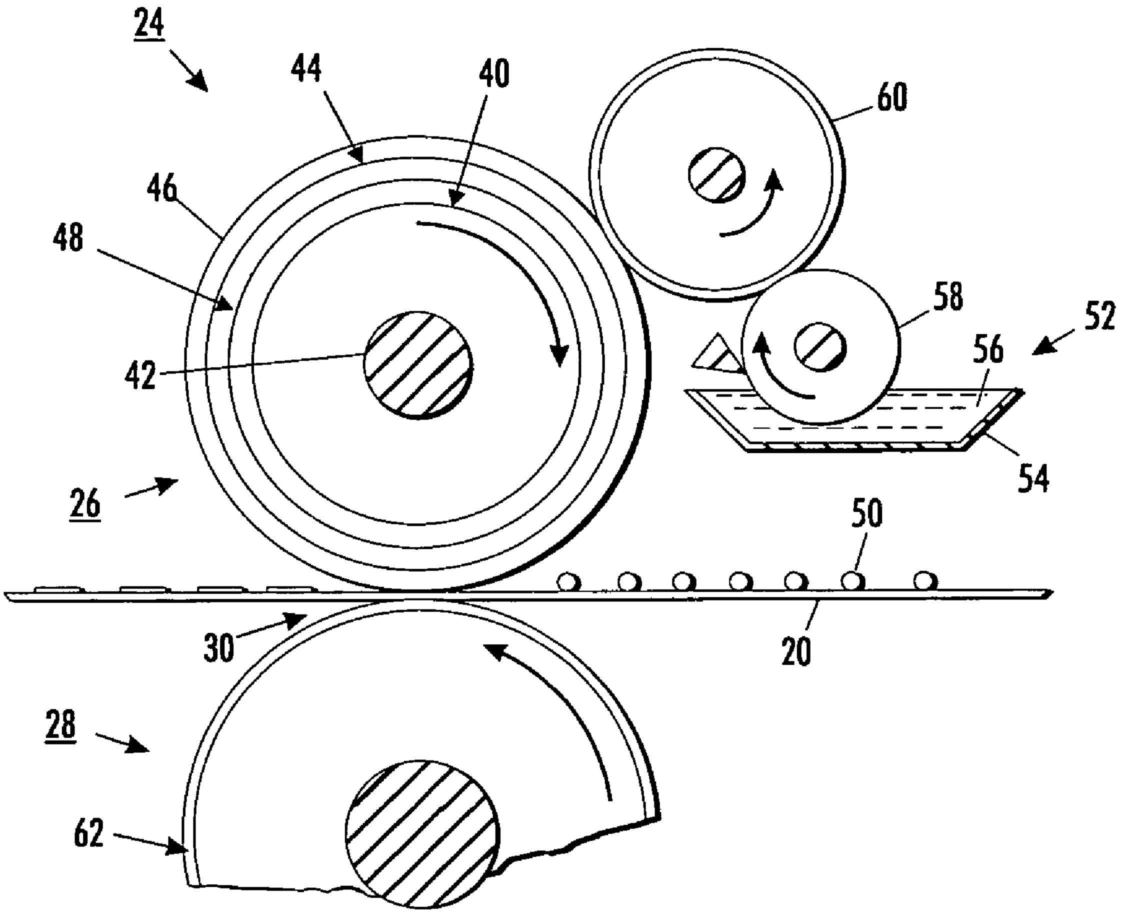
FIG. 2 is a schematic elevational view of a fusing device incorporating an exemplary fuser member.

Referring to FIG. 2, the fuser roll 26 includes a substrate which includes a cylindrical hollow member or core 40, fabricated from any suitable rigid material, such as metal, e.g., aluminum, anodized aluminum, steel, nickel, copper, or combination of materials. The core 40 may be heated, generally from within, e.g., by a heating element or elements 42, such as a resistance heater or heat pipe disposed in the hollow portion of the core which is substantially coextensive with the cylinder. However, external heaters are also contemplated. A diamond-containing polymer layer 44 disposed over the core 40 and substantially coextensive therewith defines a surface 46. In the illustrated embodiment, layer 44 forms the outermost layer of the fuser member 26. However, it is also contemplated that a further polymer layer (not shown) may be formed on the layer 44 which is substantially coextensive therewith and which may be of substantially smaller thickness than layer 44.

In various embodiments, the fuser member 26 can include an additional layer 48 or layers intermediate the core 40 and the layer 44, which may be in contact with one or both of the core 40 and layer 44 and substantially coextensive therewith. For example, the intermediate layer 48 may comprise one or more of an adhesive layer, a cushion layer, or other suitable layer positioned between core 40 and outer layer 44.

The backup or pressure roll 28 cooperates with fuser roll 26 to form a nip or contact arc 30 through which the copy paper or other substrate 20 passes such that toner images 50 thereon contact the polymer surface 46 of fuser roll 26. In the illustrated embodiment, the fuser roll is a nip-forming fuser roll, i.e., its surface is generally more conformable than that of the pressure roll 28.

In one embodiment, a layer of liquid release agent is delivered to surface 46. For example, a release agent delivery system 52 includes a sump 54 which contains polymeric release agent 56 that may be a solid or liquid at room temperature, but it is a fluid at operating temperatures. In the illustrated embodiment, the fluid 56 is transfer to a rotating pickup roll 58 and thereafter to a rotatable delivery roll 60, which is in contact with the surface 46, although other devices for applying release agent onto the surface 46 are contemplated.

In general, the release agent 56 may be applied in a controlled thickness ranging from less than a micrometer to several micrometers in thickness, e.g., from about 0.1 to about 2 micrometers or greater in thicknesses of release fluid can be applied to the surface of polymer layer 44.

The pressure member 28 may be biased into contact with fuser roll 26 by a compression device, such as a spring or the like. In one embodiment, the pressure roll 28 may include an outer layer 62 of conformable material, such as TEFLON™ or other fluoropolymer over a cylinder of aluminum or similar material, as for substrate 40. In one embodiment, the outer layer 62 of the pressure roll 28 may be configured as for layer 44. However, in general, only the fuser roll 26 has a layer configured as for layer 44. In one embodiment, pressure roll 28 may include a heating element.

The fuser member 26 in accordance with the present exemplary embodiment can be of any suitable configuration. For example, a fuser member may be in the form of sheet, a film, a web, a foil, a strip, a coil, a cylinder, a drum, a roller, an endless strip, a circular disc, a belt including an endless belt, an endless seamed flexible belt, an endless seamless flexible belt; an endless belt having a puzzle cut seam, or the like.

Figure 3:
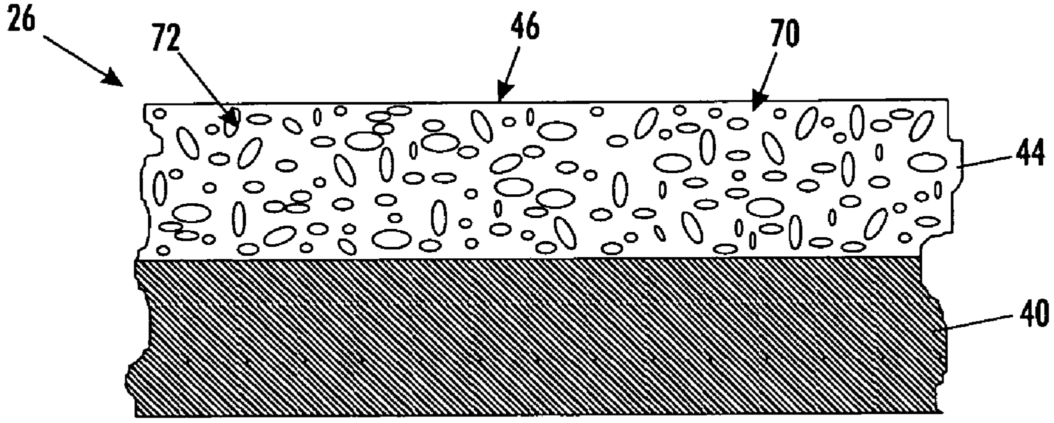
FIG. 3 is a schematic cross sectional view of a portion of a fuser member which includes an outer layer in the form of a coating comprising a diamond-containing filler in accordance with one aspect of the exemplary embodiment.

With reference to FIG. 3, the layer 44 includes a polymer matrix 70 in which a filler comprising diamond-containing particles 72 (not to scale) is distributed. While FIG. 3 shows the particles 72 as being relatively uniformly dispersed throughout the matrix 70, it is also contemplated that non-homogeneous dispersions may be formed, such as a dispersion in which the diamond-containing filler particles are predominantly in a region closer to the surface 46. As will be appreciated, fuser member 26 and layer 44 may be planar, as shown in FIG. 3, or cylindrical, as shown in FIG. 2. It will be further appreciated that a fuser member in accordance with the present disclosure is not limited to the two layer configuration shown in FIG. 3 and that any number of intermediate layers and/or adhesive layers disposed between a substrate and an outer layer are contemplated, as illustrated, for example, in FIG. 4.

Suitable substrates 40 for flexible fuser members, such as belts, include high temperature plastics that are suitable for allowing a high operating temperature (i.e., greater than about 80° C., and generally greater than 200° C.), and capable of exhibiting high mechanical strength. In various aspects, the plastic has a flexural strength of from about 2,000,000 to about 3,000,000 psi, and a flexural modulus of from about 25,000 to about 55,000 psi. Plastics possessing the above characteristics and which are suitable for use as the substrate for the fuser members include epoxy; polyphenylene sulfide such as that sold under the tradenames FORTRON® available from Hoechst Celanese, RYTON R-4® available from Phillips Petroleum, and SUPEC® available from General Electric; polyimides such as polyamideimide sold under the tradename TORLON® 7130 available from Amoco; polyketones such as those sold under the tradename KADEL® E1230 available from Amoco, polyether ether ketone sold under the tradename PEEK 450GL30 from Victrex, polyaryletherketone, and the like; polyamides such as polyphthalamide sold under the tradename AMODEL® available from Amoco; polyethers such as polyethersulfone, polyetherimide, polyaryletherketone, and the like; polyparabanic acid, and the like; liquid crystalline resin (XYDAR®) available from Amoco; ULTEM® available from General Electric; ULTRA-PEK® available from BASF; and the like, and mixtures thereof. Other suitable substrate materials include fluoroelastomers such as those sold under the tradename VITON® from DuPont; silicone rubbers, and other elastomeric materials. The substrate may also comprise a mixture of any of the above materials. In embodiments, the substrate comprises aluminum. The substrate as a film, sheet, belt, or the like, may have a thickness of from about 25 to about 250, or from about 60 to about 100 micrometers.

The matrix material 70 of outer layer 44 may comprise an elastomer, such as a thermosetting elastomer, or a thermoplastic material. In either case, the polymer may comprise a halopolymer, such as a fluorocarbon polymer. Examples of suitable elastomers which may be derived from halogen-containing monomers include chloroelastomers, fluoroelastomers and the like. Examples of fluoroelastomers include, but are not limited to, ethylenically unsaturated fluoroelastomers, and fluoroelastomers comprising copolymers and terpolymers of vinylidenefluoride, hexafluoropropylene and tetrafluoroethylene. Three known fluoroelastomers are (1) a class of copolymers of vinylidenefluoride, hexafluoropropylene and tetrafluoroethylene, known commercially as VITON A®, (2) a class of terpolymers of vinylidenefluoride, hexafluoropropylene and tetrafluoroethylene known commercially as VITON B®, and (3) a class of tetrapolymers of vinylidenefluoride, hexafluoropropylene, tetrafluoroethylene and a cure site monomer, these polymers including, for example, VITON GF®, VITON A®, and VITON B®. In another embodiment, the fluoroelastomer is a tetrapolymer having a relatively low quantity of vinylidenefluoride.

Exemplary fluoroelastomers comprising copolymers and terpolymers of vinylidenefluoride, hexafluoropropylene and tetrafluoroethylene are available commercially under the designations VITON A®, VITON B®, VITON E®, VITON F®, VITON E60C®, VITON E45®, VITON E430®, VITON B 910®, VITON GH®, VITON B50®, VITON E45®, and VITON GF®. The VITON® designation is a Trademark of E.I. DuPont de Nemours, Inc.

The VITON GF® polymer, for example, has 35 weight percent of vinylidenefluoride, 34 weight percent of hexafluoropropylene and 29 weight percent of tetrafluoroethylene with 2 weight percent cure site monomer. The cure site monomer can be those available from DuPont such as 4-bromoperfluorobutene-1,1,1-dihydro-4-bromoperfluorobutene-1,3-bromoperfluoropropene-1,1,1-dihydro-3-bromoperfluoropropene-1, or any other suitable, known, commercially available cure site monomer.

Other suitable commercially available fluoroelastomers include, but are not limited to, AFLAS®, FLUOREL® I, FLUOREL® II, TECHNOFLON® and the like.

Examples of suitable thermoplastic halopolymers for forming layer 44 include fluoropolymers such as polytetrafluoroethylene (PTFE), fluorinated ethylenepropylene copolymer (FEP), polyfluoroalkoxy polytetrafluoroethylene (PFA Teflon®), ethylene chlorotrifluoro ethylene (ECTFE), ethylene tetrafluoroethylene (ETFE), polytetrafluoroethylene perfluoromethylvinylether copolymer (MFA), and the like.

Other suitable polymeric materials suitable for forming layer 44 are described, for example, in copending application Ser. Nos. 11/139,891 and 11/135,586, incorporated by reference.

The layer 44 may be at least 1 micron in thickness. In various aspects, the layer 44 is at least 5 microns in thickness and in some aspects, at least 15 microns in thickness. In some aspects, the layer 44 is up to about 500 microns in thickness, e.g., up to about 250 microns or up to about 150 microns. In some aspects, the thickness of the outer layer is from about 5 to about 250 microns. In other aspects, the thickness of the outer layer is from about 15 to about 150 microns. In still other aspects, the thickness of the outer layer is from about 20 to about 80 microns.

The matrix material 70 may account for at least 60% by weight and in one embodiment, at least about 80% or at least 90% by weight of layer 44. The filler particles 72 may be at least about 0.1% by weight of the layer 44 and in some embodiments, at least 0.5% or at least 1% by weight of the layer 44. In various embodiments, the particles 72 may be present in the layer 44 at up to 20% by weight, such as at about 10 wt. % or less of layer 44. In general, the particles 72 may be present in layer 44 at from about 0.1 to 20 parts per hundred (pph) rubber, expressed by weight, where "rubber" constitutes the polymeric portion of the layer. For example, the diamond-containing filler may be added at about 1 pph, 5 pph, or 10 pph rubber.

The filler comprising particles 72 in layer 44 may have an average particle size of less than about 1 micrometer. In another embodiment, the filler has an average particle size of less than about 0.5 micrometers, and in some embodiments, less than 200 nanometers. In still another embodiment, the filler has an average particle size of at least 1 nm, e.g., in the range of from about 5 nm to about 100 nm. In still a further embodiment, the filler has a particle size in the range of from about 10 nm to about 80 nm. As used herein, average particle size refers to the average size of any characteristic dimension of a filler particle based on the shape of the filler particle(s), e.g., the median grain size by weight ($d_{50}$). For example, the average particle size may be given in terms of the diameter of substantially spherical particles or nominal diameter for irregular shaped particles. Further, the shape of the filler particles is not limited in any manner.

If the average size of the particles 72 is too large the particles may not stay in the matrix 70 and cause tear of the matrix. They may also interfere with release properties of the layer 44. In the size range of the exemplary embodiment, the particles remain in the matrix and increase the wear resistance of the layer 44.

In general, the particles 72 have a particle hardness of at least about 9 on the Mohs hardness scale and in some embodiments, at least 9.7 or 10, in the case of pure diamond particles, which is the maximum value on the Mohs hardness scale. It has been found that diamond is a particularly effective filler when present at small size and fairly evenly distributed though the matrix 70 (or at least in a portion of layer 44 adjacent surface 46). Even though the diamond particles have an unusually high hardness (much harder than conventional fillers used in fuser members), the particles do not appreciably result in damage to the copy sheets, wear on the pressure roll or damage to the fuser member.

In addition to having a Mohs hardness in excess of 9, the diamond particles have a thermal conductivity which aids the transfer of heat through the layer 44. Specifically, the small diamond-containing particles increase the thermal conductivity of the layer as compared to a layer without diamond particles. Thermal conductivity is the quantity of heat transmitted, due to unit temperature gradient, in unit time under steady conditions in a direction normal to a surface of unit area, when the heat transfer is dependent only on the temperature gradient. An increase in the thermal conductivity of layer 44 over that of a conventional layer of a fuser member allows for more rapid warm-up of the fuser member 26.

Silicone rubbers and Teflon® typically have a relatively low thermal conductivity of about 0.002 W/cm-K. The thermal conductivity of diamond can vary from about 6 to about 50 W/cm-K, at room temperature, depending on its purity. The amount by which the diamond particles raise the thermal conductivity of layer 44 can depend on the filler concentration and particle size as well as the purity of the particles. Weight for weight, smaller particles tend to provide the layer 44 with a greater increase in thermal conductivity than do larger particles. The thermal conductivity of the layer 44 may be increased over that of a comparable layer in which particles of conventional materials of a similar loading and particle size are employed.

The diamond-containing particles may be formed from natural or synthetic diamond or a combination thereof. Natural diamonds typically have a face-centered cubic crystal structure in which the carbon atoms are tetrahedrally bonded. The density of natural diamond is about 3.52 g/cm$^3$.

Synthetic diamond is industrially-produced diamond which is formed by chemical or physical processes, such as chemical vapor deposition or high pressures. Like naturally occurring diamond, it is composed of a three-dimensional carbon crystal. Synthetic diamond is not the same as diamond-like carbon, which is an amorphous form of carbon. Examples of synthetic diamond which may be useful in the exemplary embodiment include polycrystalline diamond and metal bond diamond. Polycrystalline diamond may be grown by chemical vapor deposition as a flat wafer of up to about 5 mm in thickness and up to about 30 cm in diameter or in some cases, as a three-dimenensional shape. Polycrystalline diamond may have a popcorn-like structure. The diamond is usually black but can be made completely transparent. The crystal structure may be octahedral.

Metal bond forms of synthetic diamond may be formed by pressing a mixture of graphite and metal powder for extended periods at high pressure. For example, a nickel/iron based metal bond diamond is produced by placing a graphite and nickel iron blended powder into a high pressure high temperature (HPHT) press for a sufficient period of time to form a product which imitates natural diamond. Other metals, such as cobalt, may also be used. After the diamond is removed from the press, it is subjected to a milling process. A chemical and thermal cleaning process may be utilized to scrub the surfaces. It may then be micronized to provide a desired size range. The particles thus formed may be flakes or tiny shards, with no consistent shape. The crystal structure may be monocrystalline, as for natural diamond.

The filler particles 72 are primarily formed of diamond, i.e., the particles 72 are at least 60% diamond and generally at least 80% or at least 90% diamond and in some embodiments at least 95% diamond and in other embodiments, greater than 99% diamond, such as pure diamond. In particular, the filler particles may comprise at least 60% by weight of crystalline carbon and in some embodiments, at least 80% or at least 90% or at least 95% crystalline carbon.

Without being bound to any particular theory, a fuser comprising an outer layer that includes a halopolymer, such as a fluoroelastomer or other fluorocarbon, and a filler wherein the filler comprises primarily diamond and has a particle size of less than about 1 microns exhibits high gloss even as the fuser is worn. As the fuser is worn, the surface remains at a relatively high gloss, and the difference in surface texture between worn and unworn surface areas will be relatively small such that the delta gloss failure modes can be reduced or, in some instances, eliminated. Thus, the use of such outer layers effectively extends the life of the fuser components. Further, the gloss of the worn areas is impacted by particle size, particle hardness and filler concentration. Gloss may, therefore, be adjusted by varying the particle size, shape of particle and/or particle hardness, and/or filler concentration to match the gloss of the roll surface.

In addition to particles 72, layer 44 may comprise particles of other materials such as particles of a softer filler material, such as carbon black, which may be present in layer 44 at amount of from about 0.1 to about 40 pph rubber. Other materials may be present in layer 44. In one embodiment, layer 44 includes a deflocculating agent, as described, for example, in application Ser. No. 11/135,586, incorporated by reference. Examples of such deflocculating agents include Disperbyk polymer compositions available from BYK Chemie and polymethacrylic acid. The deflocculating agent may be present in an amount of from about 0.1 to about 10 percent by weight of the polymer.

Optionally, the outer layer 44 composition comprises an adhesion promoter which may assist in adhering the filler particles to the matrix. An exemplary adhesion promoter is an amine modified silane, such as aminopropyltriethoxy-silane (A1100 from OSI Specialties, Friendly, W. Va.), which may be present at from about 0.01 to about 10 pph rubber.

The outer layer 44 composition may optionally comprise a surfactant. Examples of materials suitable for use as a surfactant in an outer layer 44 include, but are not limited to, fluoro-surfactants such as FC430, by 3M Corporation. In another embodiment, the outer layer is substantially free of a surfactant.

Dispersants, such as an alkali metal oxide and/or hydroxide may also be present in layer 44. Exemplary dispersants include calcium hydroxide and magnesium oxide, alone or in combination.

Figure 4:
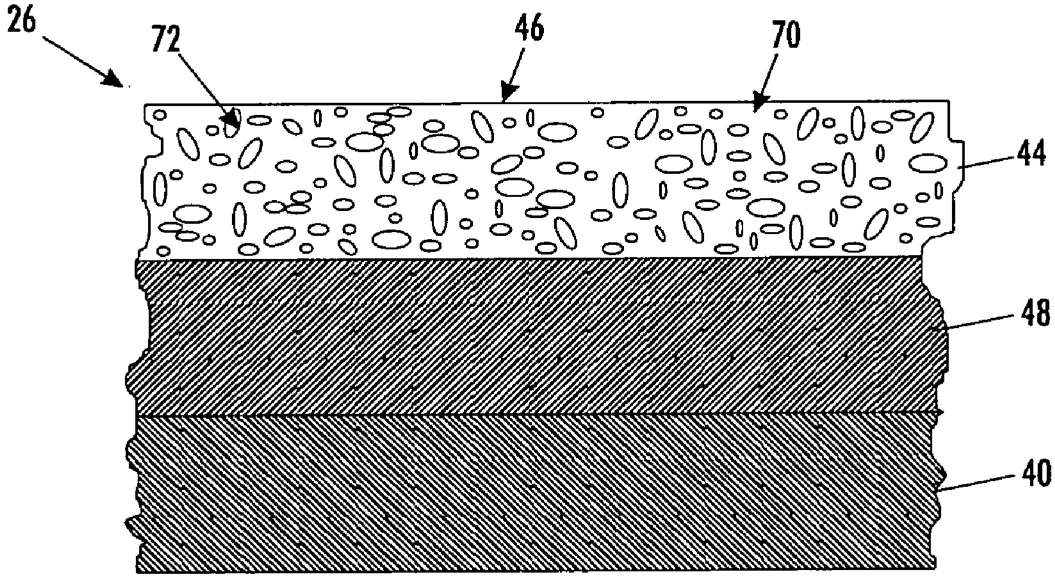
FIG. 4 is a schematic cross sectional-view of a portion of a fuser member which includes an outer layer in the form of a coating comprising a diamond-containing filler in accordance with another aspect of the exemplary embodiment.

In another embodiment of a fuser member, illustrated in FIG. 4, an intermediate layer 48 may be positioned between the substrate 40 and the outer layer 44. Materials suitable for use in the intermediate layer include silicone rubber, elastomers such as fluoroelastomers, fluorosilicones, ethylene propylene diene rubbers, silicone rubbers such as fluorosilicones, phenyl silicones, silicone blends, and the like. Additional polymers useful as the intermediate layer include fluoropolymers such as polytetrafluoroethylene (PTFE), fluorinated ethylenepropylene copolymer (FEP), polyfluoroalkoxy polytetrafluoroethylene (PFA Teflon), ethylene chlorotrifluoro ethylene (ECTFE), ethylene tetrafluoroethylene (ETFE), polytetrafluoroethylene perfluoromethylvinylether copolymer (MFA), and the like. These polymers, together with adhesives, can be included as intermediate layers and the like, and mixtures thereof. In various embodiments, the intermediate layer is conformable and is of a thickness of from about thickness of from about 50 to about 1200 micrometers, or from about 100 to about 650 micrometers.

Examples of suitable adhesives for use as an intermediate layer 48 include silanes, such as amino silanes (such as, for example, A1100 from OSI Specialties, Friendly, West Va.), titanates, zirconates, aluminates, and the like, and mixtures thereof. In an embodiment, an adhesive in from about 0.25 to about 10 percent solution can be wiped on the substrate 40. The adhesive layer can be coated on the substrate or on another intermediate layer, to a thickness of from about 2 to about 2,000 nanometers, or from about 2 to about 500 nanometers. The adhesive can be coated by any suitable, known technique, including spray coating or wiping.

The substrate 40 and optional intermediate layer(s) 48 may also include fillers dispersed therein. The fillers in the substrate and/or optional intermediate layer(s) are not critical and not limited in any manner, and not limited in terms of particle size or hardness. For example, the substrate and/or optional intermediate layer(s) may include filler particles having a particle size of less than about 3 microns and a particle hardness of at least about 3 on the Mohs' hardness scale. Examples of suitable fillers for the substrate and/or optional intermediate layer(s) include those described in U.S. Pat. Nos. 6,829,466 and 6,838,140, incorporated by reference.

The coating compositions comprising the halopolymer and filler particles in accordance with the present disclosure may be prepared by milling the halopolymer together with the filler and optionally a curative in a roll mill. The material may then be molded or extruded onto the roll/belt. Alternately, the compounded material may be milled on a roll mill and dissolved in a suitable solvent such as MEK, MIBK, acetone or the like. Alternately, portions of the material are milled on a roll mill and others may be added directly to the solvent. In yet other embodiments, milling of the halopolymer and filler may take place in the solvent, for example, in a pebble mill or Brabender-type mixer. The "dissolved" material is then coated onto the component by spraying, dipping, ring coating or flow coating.

U.S. Pat. Nos. 6,829,466 and 6,838,140, the entire disclosures of which are incorporated herein by reference.

The following examples are for purposes of further illustrating fuser components in accordance with the present disclosure. The examples are merely illustrative and are not intended to limit fuser components in accordance with the disclosure to the materials, conditions, or process parameters set forth therein. All parts are per hundred rubber, by volume, unless otherwise indicated.

EXAMPLES

A base coating is prepared by milling the following ingredients together on a roll mill:

| | | |
|---|---|---|
| Viton GF | 100 | parts (Dow-DuPont) |
| Filler | 1 | part or 10 parts of nanodiamond particles, such as 50 nm natural diamond particles or 25 nm metal diamond powder |
| $Ca(OH)_2$ | 6 | parts |
| MagO | 3 | parts |
| VC50 | 5 | parts (Dow DuPont) |
| Silane | 1 | part |

The compounded material can then be molded in a heated press in ASTM rubber pads at 350° F. The pads are demolded and can be subjected to an 18 hour post cure.

Alternatively, a coating may be formed by mixing with MEK or MIBK and the coating may be applied to a layer of silicone rubber.

Gloss measurements on the coating compositions can be made by abrading pad sections, e.g., by heating to 200° C.±7° C. and moving paper thereover under an 8.73 mm indenter ball for 5 minutes under a load of 150 g. The resultant wear scar can be evaluated with a glossmeter or using a subjective, visual observation scale.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A fuser member, for fixing a developed image to a copy substrate, comprising:

a substrate;

an outer layer over the substrate comprising a halopolymer and filler particles, the filler particles comprising diamond, and wherein the filler particles comprising diamond have an average particle size of less than 1 micrometer.

2. The fuser member of claim 1, wherein the filler particles comprising diamond are primarily formed of diamond.

3. The fuser member of claim 1, wherein the filler particles comprising diamond are at least 60% by weight natural or synthetic diamond.

4. The fuser member of claim 1, wherein the filler particles comprising diamond are at least 90% by weight natural or synthetic diamond.

5. The fuser member of claim 1, wherein the filler particles comprising diamond have a hardness of at least 9.5 on the Mohs hardness scale.

6. The fuser member of claim 1, wherein the filler particles comprising diamond have an average particle size of less than 200 nanometers.

7. The fuser member of claim 6, wherein the filler particles comprising diamond have an average particle size of from 5 nm to 100 nm.

8. The fuser member according to claim 1, wherein the filler particles comprising diamond are present in the outer layer in an amount of at least 0.1 percent by weight.

9. The fuser member according to claim 8, wherein the filler particles comprising diamond are present in the outer layer in an amount of no more than 20 percent by weight.

10. The fuser member according to claim 1, wherein the filler particles comprising diamond are present in the outer layer in an amount of at least about 1 percent by weight.

11. The fuser member according to claim 1, further comprising filler particles not comprising diamond, the filler particles not comprising diamond having a hardness which is less than that of diamond.

12. The fuser member of claim 1, wherein the halopolymer comprises a thermoplastic halopolymer which is selected from the group consisting of polytetrafluoroethylene, fluorinated ethylenepropylene copolymer polyfluoroalkoxy polytetrafluoroethylene, ethylene chlorotrifluoro ethylene, ethylene tetrafluoroethylene, polytetrafluoroethylene perfluoromethylvinylether copolymer, and combinations thereof.

13. The fuser member of claim 1, further comprising at least one intermediate layer disposed between the substrate and the outer layer.

14. The fuser member of claim 1, wherein the outer layer defines a surface of the fuser member which, in operation is coated with a liquid release agent.

15. The fuser member of claim 1, wherein the fuser member is in the form of a cylindrical roll.

16. An image rendering device comprising an image applying component for applying an image to a copy substrate and a fusing apparatus for fixing the applied image to a copy substrate, the fusing apparatus including the fusing member of claim 1.

17. A fuser member for fixing a developed image to a copy substrate, comprising:

a substrate;

an outer layer over the substrate which comprises a haloelastomer and filler particles, the filler particles comprising diamond having an average particle size of less than 1 micrometer.

18. The fuser member of claim 17, wherein the haloelastomer comprises a fluoroelastomer selected from the group consisting of a) copolymers of vinylidenefluoride, hexafluoropropylene, and tetrafluoroethylene, b) terpolymers of vinylidenefluoride, hexafluoropropylene, and tetrafluoroethylene, c) tetrapolymers of vinylidenefluoride, hexafluoropropylene, and tetrafluoroethylene, and a cure site monomer, d) volume granted fluoroelastomers, and combinations thereof.

19. An image rendering device comprising:

an image applying component for applying an image to a copy substrate; and a fusing apparatus which receives the copy substrate with the applied image from the image applying component and fixes the applied image more permanently to the copy substrate, the fusing apparatus comprising a fusing member and a pressure member which define a nip therebetween for receiving the copy substrate therethrough, at least one of the fuser member and the pressure member comprising an outer layer which comprises a matrix material comprising a fluoroelastomer and a filler dispersed therein, the filler comprising particles formed of diamond having an average particle size of 5-100 nm.

20. The image rendering device of claim 19, wherein the image applying component is a xerographic image applying component comprising a charge-retentive surface to receive an e electrostatic latent mage thereon, a development component to apply toner to the chrarge-retentive surface to develop an electrostatic latent image, and a transfer component to transfer the developed toner image from the charge-retentive surface to a copy substrate.

21. The image rendering device of claim 19, wherein the fusing apparatus includes a heater which heats the outer surface.

22. A method of forming a fusing member comprising:

providing a substrate;

forming an outer layer over the substrate, the outer layer comprising a halopolymer and filler particles, the filler particles comprising diamond, and wherein the filler particles comprising diamond have an average particle size of less than 1 micrometer.

23. The method of claim 22, wherein the forming of the outer layer comprises applying a coating comprising a matrix material and the filler particles to the substrate or to an intermediate layer formed on the substrate.

* * * * *